(12) United States Patent
Pogue

(10) Patent No.: US 7,640,236 B1
(45) Date of Patent: Dec. 29, 2009

(54) METHOD AND SYSTEM FOR AUTOMATIC DISTRIBUTED TUNING OF SEARCH ENGINE PARAMETERS

(75) Inventor: Michael Pogue, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 327 days.

(21) Appl. No.: 11/654,352

(22) Filed: Jan. 17, 2007

(51) Int. Cl.
G06F 7/00 (2006.01)
G06F 17/30 (2006.01)

(52) U.S. Cl. ............................................. 707/3; 707/5
(58) Field of Classification Search .................. 707/3, 707/5
See application file for complete search history.

(56) References Cited

U.S. PATENT DOCUMENTS

| 7,562,068 | B2* | 7/2009 | Naam ............................ 707/3 |
| 2002/0069194 | A1* | 6/2002 | Robbins ........................ 707/3 |
| 2005/0050023 | A1* | 3/2005 | Gosse et al. ................... 707/3 |
| 2005/0222989 | A1* | 10/2005 | Haveliwala et al. ............ 707/3 |
| 2006/0026147 | A1* | 2/2006 | Cone et al. ..................... 707/3 |
| 2006/0064411 | A1* | 3/2006 | Gross et al. .................... 707/3 |
| 2006/0100956 | A1* | 5/2006 | Ryan et al. .................... 705/37 |
| 2007/0185865 | A1* | 8/2007 | Budzik et al. .................. 707/5 |
| 2007/0233672 | A1* | 10/2007 | Sanfacon et al. ............... 707/5 |
| 2007/0276801 | A1* | 11/2007 | Lawrence et al. .............. 707/3 |
| 2009/0192899 | A1* | 7/2009 | Skillen et al. ................. 705/14 |

* cited by examiner

*Primary Examiner*—Mohammad Ali
*Assistant Examiner*—Patrick A Darno
(74) *Attorney, Agent, or Firm*—Marsh Fischmann & Breyfogle LLP; Kent A. Lembke (57) ABSTRACT

A method and system for automatic distributed tuning of search engine parameters includes receiving a search parameter at a search engine. The search engine is equipped with a plurality of tunable knobs set at an initial setting. The search parameter is quantified by the initial setting of the plurality of tunable knobs. A search result is generated for the search parameter based on the initial setting of the plurality of tunable knobs. The search result includes a plurality of result objects. The search result is presented by the search engine. One or more result objects selected from the search result over time, is determined. The plurality of tunable knobs in the search engine are automatically tuned using one or more search algorithms to obtain optimal search result based on the selection of the result objects over time.

20 Claims, 6 Drawing Sheets

| Experiment | Change |
|---|---|
| 1 | $K_1$ |
| 2 | $K_2$ |
| 3 | $K_3$ |
| 4 | $K_4$ |

Figure 6B

| Experiment | Change |
|---|---|
| 1 | $K_1, K_2$ |
| 2 | $K_2, K_3$ |
| 3 | $K_3, K_4$ |

Figure 6C

METHOD AND SYSTEM FOR AUTOMATIC DISTRIBUTED TUNING OF SEARCH ENGINE PARAMETERS

FIELD OF THE INVENTION

The present invention relates generally to search engines used by computing systems to find particular data, and more particularly to methods for automatically tuning search engine parameters to improve search performance.

BACKGROUND

Description of the Related Art

The Internet has emerged to be the largest repository of information that users around the world are able to access and share. The information dispersed across countless individual computer systems around the world is constantly changing and has no recognizable organization. In order to help a user to locate information of interest on the Internet, various mechanisms, such as directories and search engines, have been developed. A search engine is a computer software program designed to help users of the Internet locate information based on specific topics or keywords. A search engine visits various websites, collects and indexes Internet resources (Web pages, Usenet Newsgroups, programs, images, etc.) and dynamically builds a database classifying the Internet resources associated with different web sites. When a user accesses a search engine and submits a parameter (e.g. a keyword or keywords), the indexed database at the search engine is searched and results associated with the parameter are returned as search result (or list of results).

A typical search engine includes a wide variety of criteria based on the submitted parameter that determine the extent of indexing of the database and the organization of search results presented to the user. In order for the search engine to provide relevant search results, search engine programmers must adjust a multitude of parameters associated with various criteria. This approach presumes that a typical programmer has a fairly good knowledge of the workings of the search engine. A problem arises when the number of adjustable criteria that may be applied to a parameter are huge or the relative adjustment of one criterion negatively affects the setting of other criteria.

In addition to search engines used on the Internet, some search engines are configured for Intranets. Intranets are similar to the larger scale Internet, but the data content on a particular Intranet may be restricted to a particular company or organization. In such an instance, the Intranet includes comprehensive Intranet databases of past work, articles and associated documents that are designed to be accessible only by the organization's members, employees, or others with authorization. To find a particular document, a user conducts a search. The search, as is common on larger scale Internet searches, is determined by various criteria. Each criteria for the search is given some weight. Based on the setting for the different criteria, the search is conducted. If a sensitivity of a particular criterion is adjusted, such adjustments may affect other settings within the particular criterion or other criteria. In other words, adjustments to a given criterion will affect other criteria, and sometimes, even the most experienced search engine programmer will find it difficult to reach the best settings on all criteria, as they all can affect each other.

In order to address this issue, some of the search engines provide the option of directory or keyword searches. In some other search engines, the back-end of the search engine software is modified to enable cataloguing the most relevant search pages and indices. In this case, the popularity of a web site is used to determine the relevancy. In yet other search engines, the users are presented with a set of questions and answers to determine the search parameters so as to fine tune the search. Although these techniques have shown somewhat promising results, they still fall short of providing a fairly accurate list of relevant search results.

In view of the foregoing, it would be advantageous to have a mechanism that can automatically tune search engine parameters to generate relevant search results.

SUMMARY

The present invention fills the need by providing a search engine that performs automatic tuning of search engine parameters. The search engine receives a search parameter through a user interface and performs a search using the search parameter. The search engine is equipped with a plurality of tunable knobs related to the search parameter, that can be adjusted over time, to obtain optimal search result. A first search is conducted by the search engine using an initial setting of the tunable knobs based on the search parameter and a second search is conducted by varying the setting of one or more tunable knobs. The first and second search results including a plurality of result objects, are generated and presented at the user interface. The search engine determines one or more result objects selected over time from the generated search result and tunes the tunable knobs, using one or more search algorithm, to obtain an optimal search result.

It should be appreciated that the present invention can be implemented in numerous ways, including as a system or a method. Several inventive embodiments of the present invention are described below.

In one embodiment, a method for automatic distributed tuning of search engine parameters is provided. The method includes receiving a search parameter at a search engine. The search engine is equipped with a plurality of tunable knobs set at an initial setting. A search result is generated for the search parameter based on the initial setting of the plurality of tunable knobs. The search result, including a plurality of result objects, is presented by the search engine. One or more result objects selected from the search result over time, is determined. The plurality of tunable knobs in the search engine are automatically tuned using one or more search algorithms to obtain optimal search result based on the selected result objects over time.

In another embodiment, a system for automatic distributed tuning of search engine parameters is provided. The system includes a user interface to receive a search parameter. The system also includes a search engine communicatively connected to the user interface to receive the search parameter. The search engine is equipped with a plurality of tunable knobs set at an initial setting. The search engine performs a search based on the search parameter to generate a search result and forwards the search result to the user interface. The search result includes a plurality of result objects. The search engine performs automatic tuning of one or more of the plurality of tunable knobs using one or more search algorithms based on a selection of one or more of the result objects over time, resulting in an optimal search result.

The present invention, thus, describes system and method for automatically tuning search engine parameters to obtain an optimal search result.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

The present invention describes a system and method for providing a search engine that performs automatic tuning of search engine parameters. Accordingly, the present invention includes receiving one or more input search parameters at the search engine. The search engine is equipped with a plurality of tunable knobs that are set at an initial setting. As used herein, tunable knobs are defined as configuration parameters provided to the search engine by a developer. A search result is generated by the search engine based on one or more input search parameters ($S_i$) and an initial setting of the tunable knobs ($K_i$) and is presented at a user interface. The search result is obtained by performing a first search with the initial setting of the tunable knobs and a second search by modifying the initial setting of one or more tunable knobs. The search result thus obtained includes a plurality of result objects from both of the searches. Each result object corresponds to one or more associated tunable knobs. The search engine tunes one or more of the tunable knobs based on user selection of one or more result objects over time from the presented search result, to obtain an optimal search result.

Advantages of the current invention are identified herein. The selection of one or more result objects over a period of time indicates the order of relevancy of the result objects in the search result. This information is used to fine tune various tunable knobs so that subsequent searches can use the tuned tunable knobs to provide more focused search results that are more relevant to a user. Additionally, the search engine automatically accommodates various users and their ever-changing search requirements without requiring a programmer to continually make guesses as to which parameters need adjustment and what degree of adjustment to make.

Several embodiments for providing an automatic tuning of tunable search engine parameters within a computing system are described. It should be appreciated that the present invention can be implemented in different ways such as a system or a method. It will be apparent to those skilled in the art that the present invention may be practiced without some or all of the specific details set forth herein.

To facilitate an understanding of the embodiments, a high level overview of the computing system will now be described. The current embodiment is in no way restrictive but should be treated as an exemplary embodiment.

Figure 1A:
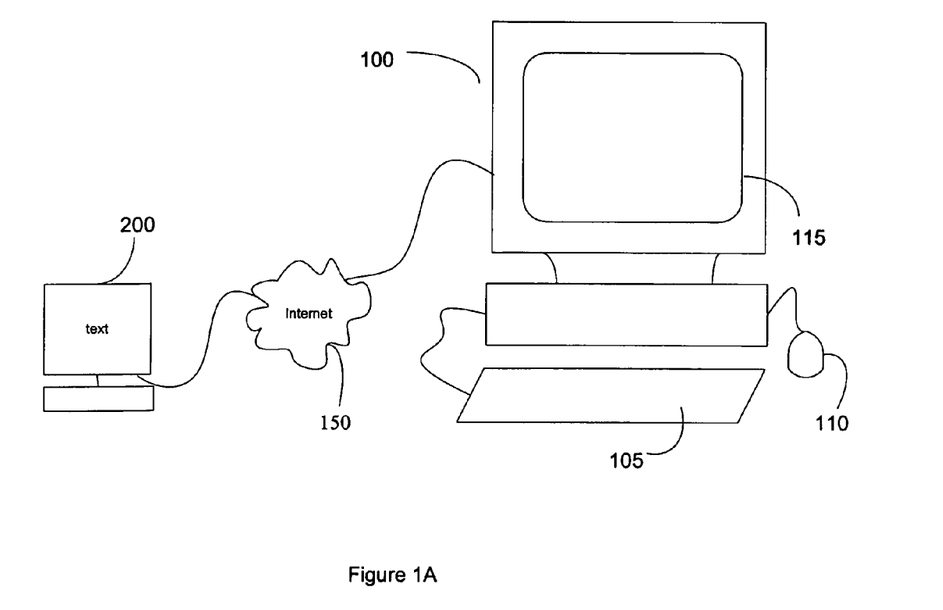
FIG. 1A illustrates a high level overview of a computer system used in carrying out an embodiment of the invention.

FIG. 1A illustrates a high-level overview of a client-server system through which an embodiment of the invention can be implemented. Accordingly, a user interface in the form of a client computer 100 is communicatively connected to a search engine residing on a server 200 through the Internet 150. In other embodiments, a local or wide area network may be used instead of the Internet 150. In this embodiment, the search engine is configured to be on the server 200 and the user interface is construed to be on a client computer 100. The search engine may be integrated into a client computer 100 along with a user interface and may access the network of computers to receive a plurality of result objects over the Internet 150. On a similar note, the user interface may be any computing device that may be configured to receive one or more search parameters and to forward the search parameters to a search engine located on the same computing device or on a different computing device which is networked or has access to the Internet 150. Referring back to FIG. 1A, the client computer 100 includes a display device 115 and an input device, such as a keyboard 105 or a mouse 110, communicatively connected to the client computer 100. The input device at the client computer 100 is used to provide one or more search parameters and to select one or more search result objects when a search result is made available at the user interface. The display device is used in displaying a search result.

Figure 1B:
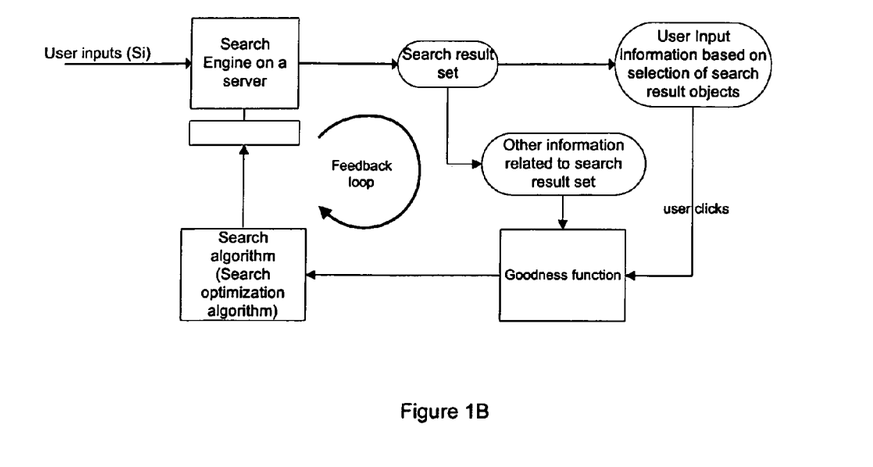
FIG. 1B is a simplified block diagram illustrating a mechanism of a tuning process, in one embodiment of the invention.

FIG. 1B is a simplified block diagram illustrating a mechanism of a tuning process, in one embodiment of the invention. As shown, a user provides one or more search parameters to a search engine located on a server 200 through a user interface associated with a client computer 100. These search parameters provided by the user(s) constitute one or more input search parameters ($S_i$) for the search engine. The search engine is equipped with a plurality of tunable knobs ($K_i$) that are set at an initial setting. These tunable knobs are defined as a set of configuration parameters that are provided by a developer of the search engine.

The search engine performs an initial search based on the input search parameters ($S_i$) received from the user and the tunable knob settings at the search engine to generate a search result. The search result may be a function represented as $R = fn(S_1, S_2, S_3 \ldots S_i, K_1, K_2, K_3, \ldots K_i)$. The generated search result, that includes a plurality of search objects, is presented to the user. The search engine then uses information from a user interface and other information (such as user response time) related to the generated search result to arrive at a "goodness" function. The information from a user interface may be in the form of user clicks on one or more search result objects upon presentation of the search result, the user clicks and the time it takes a user to respond indicating the relevancy of the search result objects to the search query. Other information related to the generated search result may include factors such as processor time to obtain search result, memory utilization, etc. Processor time and memory utilization, for example, may be tunable knob settings that are relevant to the generation of the overall search result. The goodness function is defined with user input information and other information related to the generated search result, as input variables. This defined goodness function is, then, used by an optimization algorithm to adjust the tunable knobs over time to fine tune the search and provide an optimal search result. The process of receiving information from a user interface, defining a goodness function to fine-tune the search at the search engine is on-going, so as to adaptively provide an optimal search result to a user query. The on-going adjustment process within the search engine allows the search engine to accommodate the ever-changing search requirements of the users.

Figure 2:
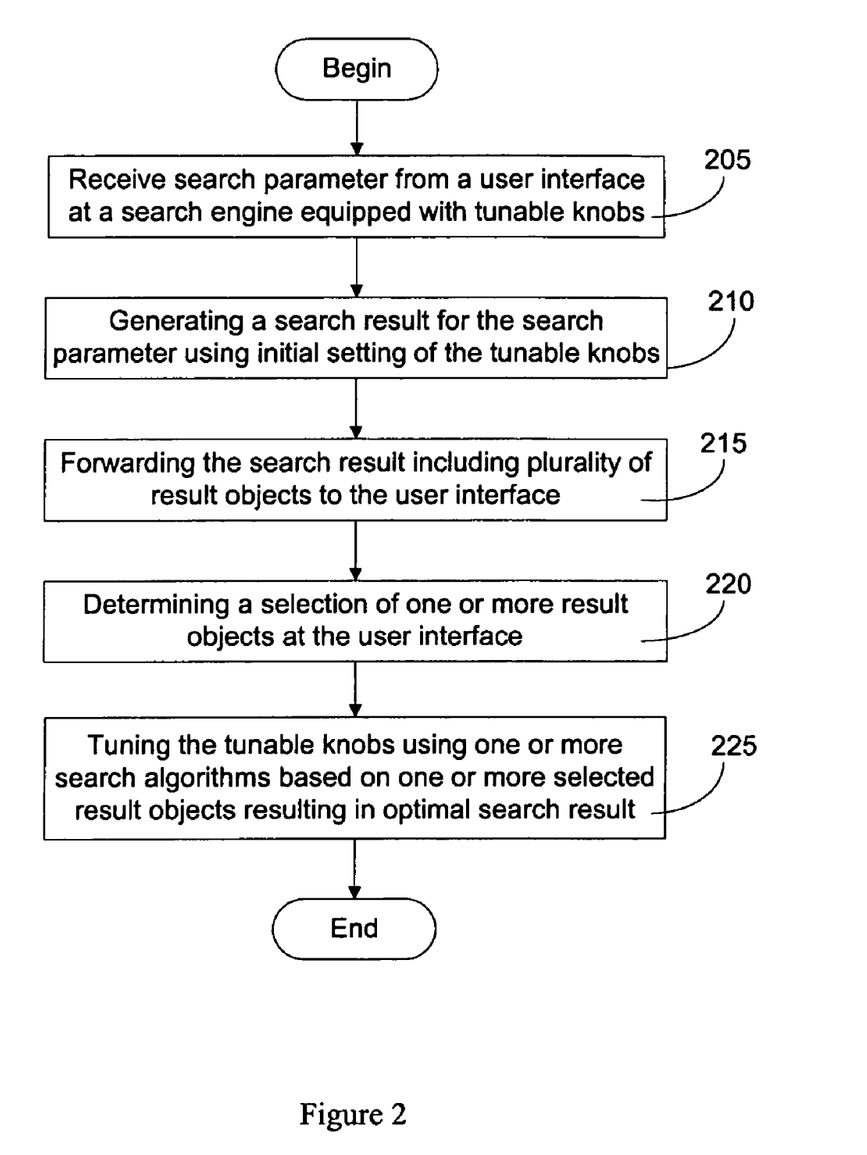
FIG. 2 illustrate a flowchart of operations for obtaining an optimal search result, in one embodiment of the invention.
Figure 3:
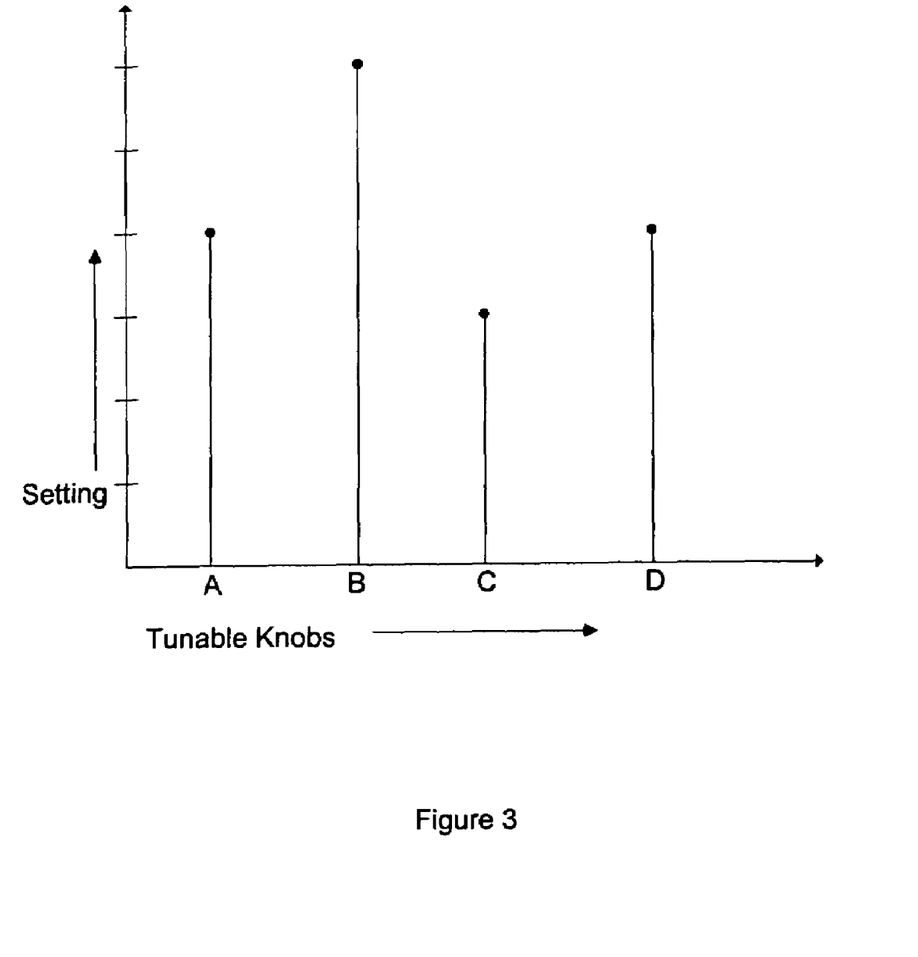
FIG. 3 illustrates an initial setting of a plurality of tunable knobs and the weight associated with each knob used in implementing a search query, in one embodiment of the invention.

FIG. 2 illustrates an overview of the process operations involved, in one embodiment of the invention. The method begins at operation 205 wherein a search parameter is received at the search engine. In one embodiment, the search parameter is received at an user interface and forwarded to the search engine. The search parameter identifies a user's preference for conducting a search. The search engine includes a plurality of tunable knobs. These tunable knobs are set at an initial setting. Each of the tunable knobs initial setting may take into consideration the tunable knob's weight in the overall relevancy of the search. Each of the tunable knobs, for example, may be associated with one or more criteria of search parameter such as nouns, adjectives, adjacency of one or more words within search parameter, pages containing code, body text, italicized text and their respective weights in the overall search. An example of the initial setting of knobs A, B, C, and D is shown in FIG. 3. As illustrated, setting of knob B may affect the search more significantly than settings of knobs A, C and D. The settings of Knobs A and D may affect the search equally. Setting of Knob C may affect the search least. The initial setting of the tunable knobs may be based on a random algorithm executed at the search engine.

In operation 210, the search engine performs a search based on the search parameter using the tunable knob settings and generates a search result. For every search request, the search engine performs two (or more) searches based on different settings of the tunable knobs. Accordingly, the search engine uses the initial setting of the tunable knobs ($K_i$) and performs a first search to obtain a first search result where the first search result, $R_1 = fn(S_1, S_2, S_3 \ldots S_i, K_1, K_2, K_3, \ldots K_i)$. The search engine then adjusts the setting of one or more tunable knobs to a second setting ($K_i'$) and uses this adjusted setting of tunable knobs to conduct a second search and obtain a second search result where the second search result, $R_2 = fn(S_1, S_2, S_3 \ldots S_i, K_1', K_2', K_3', \ldots K_i')$. In an embodiment of the invention, one of the available tunable knobs is identified and adjusted to arrive at a second setting. In another embodiment, all of the available tunable knobs are adjusted to arrive at a second setting. The search results so obtained include a plurality of result objects. These result objects may include text, images, audio clips, video clips and other internet resources. In some cases, the search may yield one or more result objects that are common to both the search results.

Upon generating the first and second search results $R_1$ and $R_2$, the search engine then combines the two search results $R_1$ and $R_2$ into a combined search result, R. The combined search result may be obtained by joining the two search results in a variety of ways. In one embodiment, the first search result is combined with the second search result in a random fashion so that result objects from the first search result are randomly interleaved with the result objects from the second search result. By interleaving the search results randomly, factors affecting the relevancy, such as presentation bias, may be eliminated. Presentation bias is bias present in an user's decision of choosing an object from a list of objects based on the position of the object rather than its relevancy. For example, in a web search, users may pay significantly more attention to search results ranked higher than those ranked lower even though the lower ranked search results may be more relevant to a user's information need. The random interleaving of search results eliminates such presentation bias, thus providing for an unbiased representation of search result relevancy.

Figure 4A:
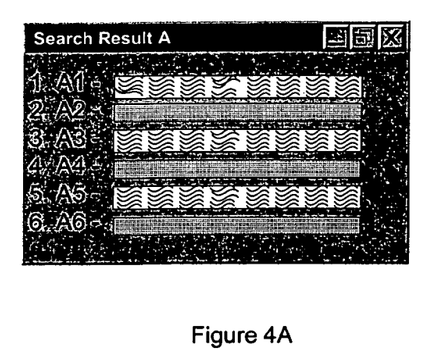
FIGS. 4A through 4C illustrate search results obtained using two different settings of tunable knobs, according to one embodiment of the invention.
Figure 4B:
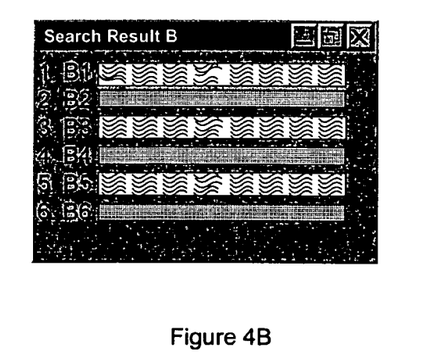
Figure 4C:
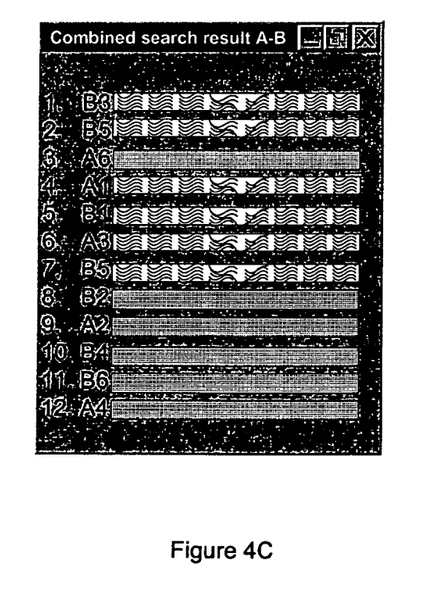

Continuing to refer to FIG. 2, if a result object is found in both the first search result and a second search result, the combined search result may include a single representation of the duplicate result object. A sample of the first search result, the second search result and the combined search result are illustrated in FIGS. 4A-4C. As can be seen in the combined search result of FIG. 4C, there is no set order in the interleaving of the result objects from first and second search results. The combined search result is then presented at the user interface, as illustrated in operation 215. Each of the result objects in the combined search result is associated with one of the tunable knob settings. The search result may be presented at the user interface on a display device 115 communicatively connected to the user interface.

In operation 220, a selection of one or more result objects at the user interface is identified by the search engine. A user upon presentation of the search result, selects a result object, which provides information to the search engine about the relevance of the result object to the user's search query. In this embodiment, the user's selection is captured and transmitted to the search engine. The selected result object identifies one of the two tunable knob settings currently available at the search engine to which the selected result object belongs. The selection of the result objects for a plurality of users are collected over a period of time and used to determine which associated tunable knob settings provides a more relevant search result. In one embodiment, a counter is associated with each setting of tunable knobs. In this embodiment, every time a result object is selected, the associated counter for that tunable knob setting is incremented. In cases where a selected result object is common to both first search result and second search result, both the counters are incremented. The selection of result objects and the associated counters are gathered over a period of time. At the end of the period, the search engine compares the two counters associated with the two tunable knob settings. If the counter value for a particular tunable knob setting exceeds the other counter value significantly, then that setting is considered more relevant to the search query. In such a case, the least significant tunable knob setting is disregarded and the process continues with the significant tunable knob setting as the initial setting, one or more of the tunable knobs adjusted to obtain a second setting and the process of fine tuning the search continues. In order to obtain the tunable knob setting for n knobs, a multivariable derivative (multivariable function) of the tunable knobs can be used in obtaining the optimal tunable knob setting. In case where the first counter value is close to the second counter value, the relevancy of the tunable knob settings are not distinguishable. This may mean that the search results are at a peak in a relevancy curve. At such times, the algorithm may "hunt" around within a vicinity of the tunable knob settings to ensure that the search algorithm provides the optimal search result. In such a case, the search engine may randomly pick one of the two tunable knob settings to adjust and tune, or tuning may continue by adjusting the two tunable knob settings, or a new second tunable knob setting can be chosen for further tuning.

During the process of adjusting and re-adjusting the tunable knob settings to obtain an optimal search result described above, the adjustment process of the search engine may, in some cases, converge to a local maximum rather than a better global maximum value. A local maximum, also called a relative maximum, is a maximum value of a set, function, etc., over a small range of variables, that may not be a global maximum. However, in some instances, the local maximum may also be a global maximum. The global maximum value, on the other hand, is defined as the largest overall value of a set, function, etc., over its entire range of variables. An appropriate search algorithm may be employed to detect the global maximum value. The search algorithm may easily identify a local maximum setting but can be adjusted to find the global maximum setting of the tunable knob.

Figure 5A:
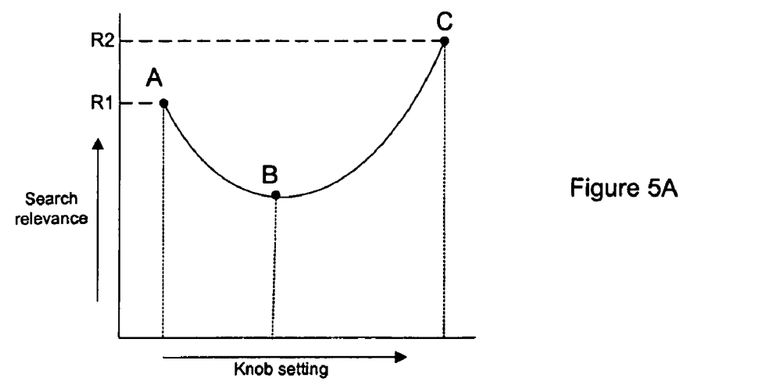
FIGS. 5A through 5C provide high-level graphical illustration of a local maxima and global maxima of tunable knobs, in one embodiment of the invention.
Figure 5B:
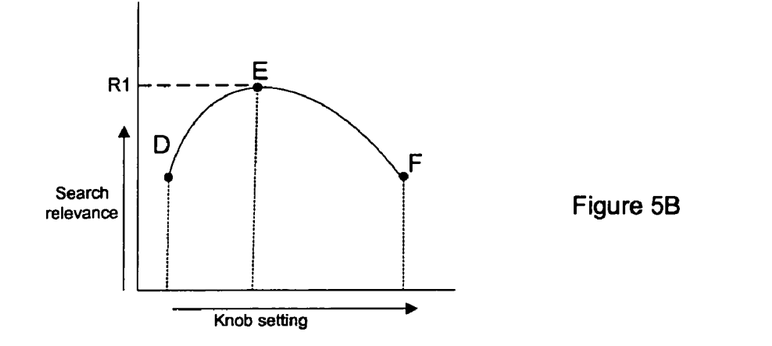
Figure 5C:
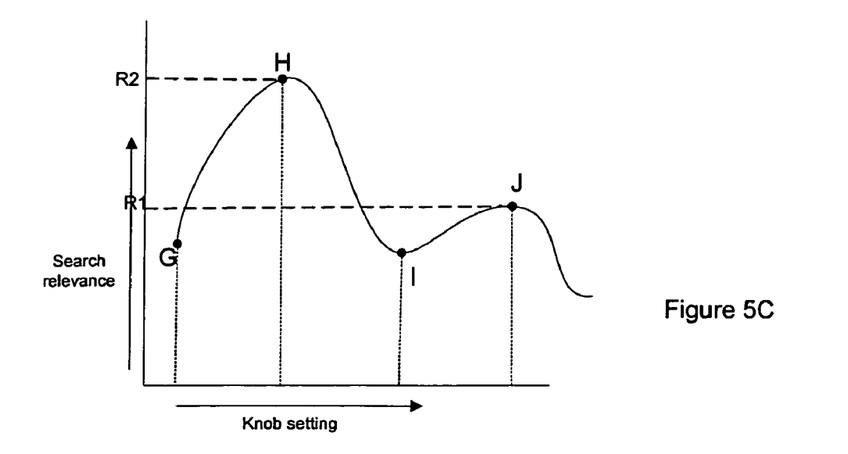

FIGS. 5A through 5C illustrate various different scenarios where the function identifies the local maxima and global maxima setting for a particular tunable knob setting. In FIG. 5A, point C identifies the global maxima setting of tunable knobs, point A identifies the local maximum setting of the tunable knobs and point B identifies a local minimum setting of the tunable knobs. In order to obtain an optimal search result, the search algorithm should converge to the global maxima setting of the tunable knob setting, in this case, C. In an alternative scenario illustrated in FIG. 5B, the local maxima setting are represented by points D and F and the global maximum setting is represented by point E. In this case, the search algorithm needs to converge the tunable knob setting to point E to provide an optimal search result. In an alternative scenario illustrated in FIG. 5C, the local maxima settings are represented by points G, I and J and the global maximum setting of the tunable knobs is represented by point H. As stated above, the search algorithm may converge on the local maximum at point J. However, the search algorithm may need to hunt around further to ensure that the search algorithm converges to the global maximum setting of point H in order to provide an optimal search result. It is noted herein that the graphs illustrated in FIGS. 5A through 5C illustrate a n-dimensional space with n number of knobs and each point of the graphs in FIGS. 5A through 5C represents a setting of tunable knobs in that n-dimensional space.

In operation 225, the tunable knob setting identified by comparing the first counter with the second counter, is used by the search engine to fine tune the search result. In order to fine tune the identified tunable knob settings, the search engine engages one or more "hill-climbing" search algorithms available to the search engine that uses the multivariable function of the tunable knobs to identify the local maxima and the global maxima setting of the tunable knobs. These search algorithms tune the appropriate tunable knob settings over time, without needing to explicitly understand the underlying weight of each tunable knob setting or the interaction between knobs. Some of the "hill-climbing" search algorithms that may help in finding the best setting of the tunable knobs to obtain optimal search include Powell's method, simulated annealing, genetic algorithm, and neural network. It is noted here that the above list of available algorithms is not an exhaustive list and other multivariable optimization algorithms may be used to arrive at the optimal search result. These multivariant optimization algorithms are capable of identifying one or more local maxima and a global maxima. Essentially, these algorithms figure out what the correct setting of the tunable knobs are, regardless of the weight each of the tunable knob settings have in the overall search. If a particular tunable knob has a low effect in reaching the overall global maxima, then it does not matter where that tunable knob is set. These algorithms may try to change the setting of that particular tunable knob and once the algorithms realize that the various settings are immaterial to the search result, may stop changing that tunable knob. The ideal search result is obtained when the tunable knobs are set such that the resulting relevancy is at a global maximum. As mentioned earlier, the global maximum setting identifies the setting of the tunable knobs which produces an optimal search result. This global maximum setting of the tunable knobs is then used in subsequent searches as the initial setting and the process cycle repeats until an optimal search result is obtained.

In a real world situation, search engine users and their requirements keep changing. The present invention accommodates these changes by dynamically re-setting the tunable knobs based on the selection of result objects over time. Every time a new search query is received, new search results are generated for the new search query and presented to the user. The search engine captures one or more result objects selected over a period of time, increments the appropriate counters and tunes the appropriate tunable knob settings to obtain the optimal search result. The selected result objects identify the associated counter to increment. Using the current setting of the tunable knobs as the initial setting in subsequent searches, the search is constantly fine-tuned to produce a more focused and optimal search result. A sample pseudo-code that illustrates the various operations of the present invention is provided herein:

PSEUDO-CODE:
```
    currentKnobSet=K0;
    testKnobSet=K0+delta;
    //where delta means that the position
    //of at least one knob is changed from K0
    For each (query from a user)
    {
    resultSet1=search(currentKnobSet);
    resultSet2=search(testKnobSet);
    presentResults(user, randomInterleave(resultSet1, result-
       Set2);
       //results are randomly interleaved, to eliminate
       //bias. If there are duplicates, merge them.
    if (user clicks on anything presented)
    {
       searchEngine[that returned that particular result]+=1;
       //if this was a merged dup, credit both.
    }
    after (some number of clicks have been captured)
    {
       if (searchEngine[testKnobSet]>searchEngine[current-
          KnobSet])
       {
          currentKnobSet=testKnobSet;
          testKnobSet=newDeltaUsingOneOf(
          Powell's Method,
          Simulated Annealing,
          Genetic Algorithm,
          Neural Net);
       }
    }
    }
```

Although the aforementioned embodiments were discussed with two search results being generated and used to provide a combined search result by interleaving the two search results and presenting the combined search result to the users, the generation of search result is not restricted to generating two search results with two different tunable knob settings. More than two tunable knob settings may be employed and the results obtained from each of the tunable knob settings may be interleaved and presented to the users as a combined search result. Further, each of the tunable knob settings are associated with a counter and the respective counters are incremented when result objects from the respective search results are selected over time. The counters are compared after a certain period of time to determine the most relevant setting of tunable knobs for providing the optimal search result.

Figure 6A:
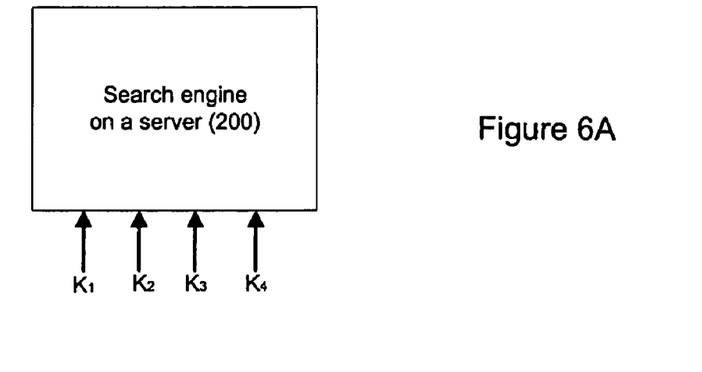
FIGS. 6A-6C illustrate the tuning process using a plurality of tunable knobs with and without factor analysis.
Figure 6B:
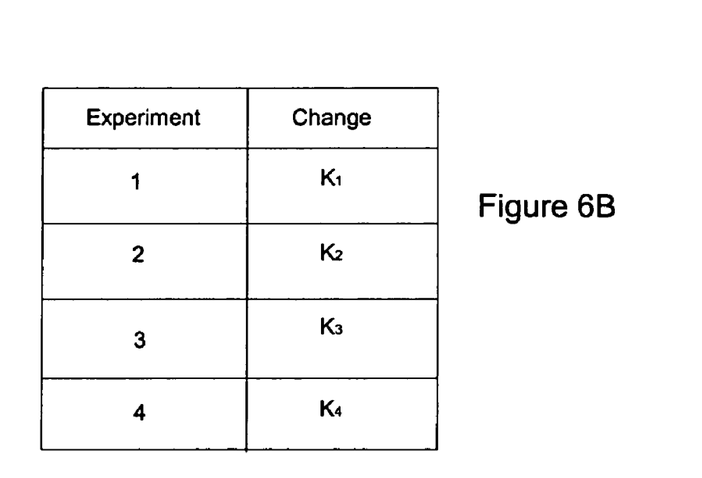
Figure 6C:
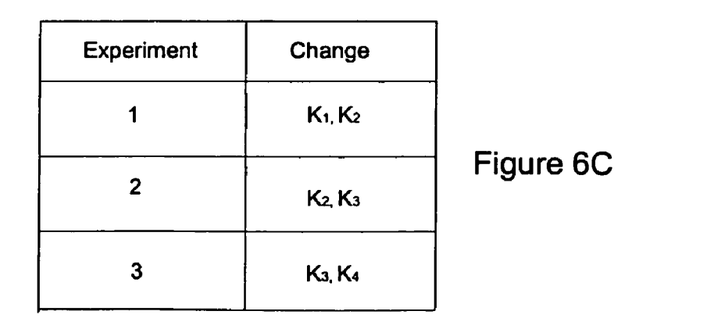

Further, to allow the tuning process to tune faster, factor analysis may be used. Factor analysis is a mathematical tool which can be used, in this case, to fine tune tunable knob settings faster in a shorter number of steps and by conducting fewer experiments (tunable knob settings). The factor analysis, with reference to the current embodiments of the invention, can be explained in more detail with reference to FIGS. 6A-6C. FIG. 6A shows a search engine with a plurality of tunable knobs available for tuning. FIG. 6B identifies the tuning that has to be performed without factor analysis. Every time a tunable knob is tuned, an experiment is performed. Accordingly, experiment 1 is performed by tuning tunable knob K1, experiment 2 with tunable knob K2, and so on. FIG. 6C identifies the number of experiments that need to be performed using factor analysis. As shown in FIG. 6C, in experiment 1 tunable knobs K1 and K2 are tuned to arrive at some optimal search result. In experiment 2, tunable knobs K2 and K3 are tuned to arrive at some optimal search result, and so on. By providing an automatic tuning of more than one tunable knob every time a search query is received at the search engine, a more effective search is implemented in a shorter period of time. The process is very robust and easily accommodates the changing demands of the users and their requirements. The process is simple to implement and does not have to be customized every time a new search requirement or a new user is added.

The invention may be practiced with other computer system configurations including hand-held devices, microprocessor systems, microprocessor-based or programmable consumer electronics, minicomputers, mainframe computers and the like. The invention may also be practiced in distributed computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

It will be obvious, however, to one skilled in the art, that the present invention may be practiced without some or all of these specific details. In other instances, well known process operations have not been described in detail in order not to unnecessarily obscure the present invention.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method for automatic distributed tuning of search engine parameters, comprising:
   receiving a search parameter at a search engine equipped with a plurality of tunable knobs set at an initial setting;
   generating a first search result for the search parameter based on the received search parameter and the initial setting of the plurality of tunable knobs,
   automatically adjusting setting of the plurality of tunable knobs to a second setting;
   generating, using a microprocessor, a second search result for the search parameter based on the received search parameter and using the second setting of the plurality of tunable knobs, wherein the first and second search results include a plurality of result objects;
   combining, using a microprocessor, the plurality of result objects from the first search result with the plurality of result objects from the second search result to generate a combined search result and presenting the result objects from the combined search result in response to the search parameter;
   determining, using a microprocessor, a selection of one or more of the result objects from the combined search result over time, the selection of the result objects identifying the associated tunable knob settings; and
   selecting, using a microprocessor, one of the two tunable knob settings to be retained as the initial setting for a subsequent search, the selection of the two tunable knob settings based on the selection of one or more result objects over a period of time, the selected tunable knob setting providing an optimal search result for the search parameter.

2. The method for automatic distributed tuning of search engine parameters of claim 1, wherein presenting the search result further comprising:
   interleaving the result objects from the first search result with the result objects from the second search result to generate a combined search result; and
   presenting the combined search result.

3. The method for automatic distributed tuning of search engine parameters of claim 2, wherein the result objects from the first search result and the second search result are interleaved randomly.

4. The method for automatic distributed tuning of search engine parameters of claim 2, wherein the combined search result is an indexed set of result objects.

5. The method for automatic distributed tuning of search engine parameters of claim 2, wherein determining a selection of one or more of the result objects over time further comprising:
   identifying a first counter for the first search result;
   identifying a second counter for the second search result; and
   incrementing one of the first counter or the second counter upon selection of the result object from the combined search result, the selected result object identifying one of the first search result defining the initial setting of plurality of tunable knobs or the second search result defining the second setting of the plurality of tunable knobs to which the selected result object belongs.

6. The method for automatic distributed tuning of search engine parameters of claim 5, wherein selecting one of the two tunable knob settings further comprising:

comparing the first counter with the second counter to determine the counter with a maximum value, the counter with the maximum value identifying the corresponding tunable knob setting and result objects relevant to a search;

retaining the tunable knob setting with the maximum counter value as the initial tunable knob setting for the subsequent search; and disregarding the other tunable knob setting.

7. The method for automatic distributed tuning of search engine parameters of claim 5, wherein at least one selected result object is common between the first search result and the second search result.

8. The method for automatic distributed tuning of search engine parameters of claim 7, wherein the first counter and second counter are both incremented upon selection of the common result object.

9. The method for automatic distributed tuning of search engine parameters of claim 1, wherein adjusting setting of the plurality of tunable knobs is by choosing one tunable knob at a time and adjusting the knob to attempt to obtain a more optimal search result.

10. The method for automatic distributed tuning of search engine parameters of claim 1, wherein adjusting setting of the plurality of tunable knobs is by choosing a plurality of tunable knobs at a time and adjusting the plurality of tunable knobs to attempt to obtain a more optimal search result.

11. The method for automatic distributed tuning of search engine parameters of claim 1, wherein adjusting setting of the plurality of tunable knobs is to identify at least a local maxima and at least a global maxima using one or more search algorithms.

12. The method for automatic distributed tuning of search engine parameters of claim 11, wherein adjusting setting of the plurality of tunable knobs is to identify the global maxima, the global maxima determining the optimal setting of the tunable knobs for arriving at an optimal search result.

13. The method for automatic distributed tuning of search engine parameters of claim 5, further comprising generating a third search result for the search parameters based on the received search parameter and using a third setting of the plurality of tunable knobs, the third setting of the plurality of tunable knobs obtained by adjusting one or more of the plurality of tunable knobs, the third setting of the plurality of tunable knobs being different from the initial and the second settings, wherein the third search result includes a plurality of result objects, and wherein the result objects are presented from the first search result, the second search result and the third search result, the third search result associated with a third counter that gets incremented when a result object from the third search result is selected.

14. The method for automatic distributed tuning of search engine parameters of claim 13, wherein selection of one or more of the result objects over time including selection of one or more result objects from two or more searches.

15. The method for automatic distributed tuning of search engine parameters of claim 1, wherein receiving a plurality of search parameters and determining a selection of one or more of the result objects is through an user interface.

16. A system for automatic distributed tuning of search engine parameters, comprising:

a computer system, the computer system including a user interface configured to receive a search parameter; and a search engine with a program stored in a computer memory, which when executed by the computer system performs automatic distributed tuning of search engine parameters, the program includes logic to, interact with the user interface to receive the search parameter, the search engine equipped with a plurality of tunable knobs set at an initial setting;

generate a first search result for the search parameter based on the received search parameter and the initial setting of the plurality of tunable knobs, automatically adjust setting of one or more of the plurality of tunable knobs to a second setting;

generate, using a microprocessor, a second search result for the search parameter based on the received search parameter and using the second setting of the plurality of tunable knobs, wherein the first and second search results include a plurality of result objects;

combine, using a microprocessor, the plurality of result objects from the first search result with the plurality of result objects from the second search result to generate a combined search result;

forward the combined search result with the plurality of result objects to the user interface;

receive a selection of one or more of the result objects over time from the user interface, the selection of one or more result objects identifying associated tunable knobs; and select, using a microprocessor, one of the two tunable knob settings to be retained as the initial setting for a subsequent search, the selection of one of the two tunable knob settings based on the selection of one or more result objects over time, the selected tunable knob setting provides an optimal search result for the search parameter.

17. The system for automatic distributed tuning of search engine parameters of claim 16, wherein the user interface further including an input device to, receive the search parameter;

select one or more result objects; and a display device to display the combined search result upon receiving the combined search result from the search engine.

18. The system for automatic distributed tuning of search engine parameters of claim 16, wherein the program logic to generate the combined search result further includes, program logic for executing a first search using the initial setting of the tunable knobs to obtain first search result;

program logic for executing a second search using a second setting of the tunable knobs, the second setting of the tunable knobs obtained by adjusting at least one of the tunable knobs; and interleaving the first search result with the second search result to obtain the combined search result.

19. The system for automatic distributed tuning of search engine parameters of claim 18, wherein the program in the search engine further includes logic to generate, a first counter associated with the first search result; and a second counter associated with the second search result, wherein one of first counter or second counter is incremented upon selection of the result object from the combined search result, the selected result object identifying one of first search result defining the initial setting of plurality of tunable knobs or the second search result defining the second setting of the plurality of tunable knobs to which the selected result object belongs.

20. The system for automatic distributed tuning of search engine parameters of claim 19, wherein the program in the search engine further includes logic to generate a third search result for the search parameter based on the received search parameter and using a third setting of the plurality of tunable knobs, the third setting of the plurality of tunable knobs obtained by adjusting one or more of the plurality of tunable knobs, the third setting of the plurality of tunable knobs being different from the initial setting and the second setting, wherein the third search result including a plurality of result objects is included in the combined search result forwarded to the user interface, the program further including logic to generate a third counter associated with the third search result, wherein the third counter is incremented upon selection of the result object from the third search result, and wherein receiving a selection of one or more of the result objects over time includes receiving a selection of one or more of the results objects from two or more searches and selections.

* * * * *